UNITED STATES PATENT OFFICE.

ELIAS INGRAHAM, OF BRISTOL, CONNECTICUT.

IMPROVEMENT IN THE EMBELLISHMENT OF GLASS.

Specification forming part of Letters Patent No. 109,626, dated November 29, 1870; reissue No. 4,441, dated June 27, 1871.

*To all whom it may concern:*

Be it known that I, ELIAS INGRAHAM, of Bristol, county of Hartford and State of Connecticut, have invented certain new and useful Improvements in the Process of Embellishing Glass for Clock-work and other like purposes; and to enable others skilled in the art to practice the same I will proceed to describe it.

My invention relates to the decoration, in gilt, bronze, &c., of that surface of glass which is the inner surface, (as, for instance, in plate-glass windows, &c.,) the finished and tasteful effect appearing through the glass and being viewed by the spectator from the outside; and it consists in an improved process of ornamenting or embellishing plate or other glass, whereby elaborate and artistic designs may be put thereon in an economical manner and by comparatively unskilled workmen. This process I will now proceed to describe.

When a single impression is to be made on the glass a single plate is provided, (preferably of metal,) upon the face of which is cut or otherwise formed the desired figure which is to be displayed upon the glass—say, for instance, the figure of an eagle. An elastic roller is provided and mounted or arranged in any well-known way, so that it may be easily and accurately rolled or reciprocated over the figure-plate, and also over the back or inner side of the glass. The figure-plate I arrange upon the bed or table of a machine or apparatus in which the said elastic roller is caused to traverse, in order that an impression may be taken up therefrom by such roller, as hereinafter described, and thus be ready, by a further succeeding action of the roller, to be transferred to the outer surface of the gilding or bronze previously secured to the glasss, as hereafter stated. The apparatus being now ready, the back of the glass plate to be decorated is first perfectly cleaned. That portion of it upon which it is desired to produce the embellishment or figure is then sized with an appropriate transparent adhesive material, and a coating of gold-leaf or bronze is laid thereon and the sizing allowed to dry, causing the gilt (or bronze, &c., as the case may be) to adhere sufficiently to the glass. A proper size to affix the gold-leaf to the glass is composed of a weak solution of fish-glue dissolved in water, the same being so thin as to be scarcely discernible by sight from clear water, the essential properties of such size being, first, that it shall be so clear and transparent as not to destroy or mar the brilliant luster of the gold-leaf; second, that it shall be strong enough to retain the desired portion of the gold-leaf; and third, that it shall be weak enough to allow of the surplus portion of the gold-leaf to be washed off without rubbing so hard as to also remove that portion which is backed by another size, as hereinafter described, and is desired to be retained. Next in order, a paint, composition, size, or other suitable material is applied to the surface of the figure-plate and is then taken up from such plate by the elastic roller, which, for that purpose, is passed over the plate. The roller, being thus made the recipient of the figure, is next caused to roll over the gilded or bronzed surface of the glass, and thus to transfer to the back of such surface the precise figure or impression which it receives from the design or type-plate, after which the painted or other figure so transferred is allowed to dry upon the gilt or bronze, and then the surplus of the gilt or bronze—viz., that part not covered by and fastened down by the paint, (or, in other words, all except the ornamental figure,)—may be washed or rubbed off from the glass, and the figure only will remain to view from the opposite or front side of the glass. A suitable paint, composition, or size, with which to affix or imprint the desired design upon the back of the gold-leaf, is composed substantially as follows, viz.: One part Damar varnish, two parts fat oil, (dried linseed-oil,) and three parts of asphaltum varnish—that is, asphaltum cut with turpentine.

In case any of these substances have become thick by age, or otherwise vary from their usual marketable form or consistency, it may be necessary to temper the size, which may be done by adding a little of either of the above, as may be necessary to give the desired property, the essential qualities being that it shall have sufficient body to back or hold the gold-leaf; that it will dry hard in a reasonable time, but not before it is properly transferred from the figure-plate to its proper place on the glass; and that it shall not be so sticky as to tear the gold-leaf from the glass when the size is being transferred from the rollers to the gold-leaf on the glass. Of course I do not wish to limit myself to the above size or sizes, but describe the same to enable others skilled in the art to understand and use my process. A coat of paint may, by way of protecting the whole, be applied, if desired, to the whole back of the glass or to the entire space included within the exterior outline of the figure; but this is not an essential thing.

When still further ornamentation is desired, or another color is to be added after the gilded or bronze ornament has been just applied, (and before any protecting coat of paint last above mentioned shall have been applied,) another plate is employed, having cut or made thereon a figure adapted to the parts left uncovered or washed away from the glass, so that the figure on one plate may be impressed or imprinted into the interstices left unprinted by the other plate; and in order to effect this the elastic roller is again employed to transfer a paint or colored material from such second plate to the glass, proper guides or registers insuring the deposit of this second transfer accurately, relatively to the interstices in the gilded figure. The glass is then put away or left to dry this last impression. If further interstices remain to be filled, or any further impressions or ornamentations are to be made on the same glass, other figure-plates adapted therefor may be used, and the process repeated in the same manner.

It will now be seen that by my novel process the leaf or bronze is first applied to a sufficient area of the glass by means of an adhesive material, but without any reference to the exact shape or character of the figure to be produced; after which, and by means of any mechanism in common use adapted to such purpose, the plate or plates are supplied with the paint or imprinting material, and by any well-known means or mechanism the elastic roller is moved over it, and then over the leaf or bronze on the glass, and then, after drying, the surplus gilt or bronze is removed, the ornamental figure (say an eagle) in gilt or bronze being displayed through the glass, and in a highly-finished and artistic style, resembling work done by hand and brush, and which would require artists of a high order. My process has this peculiar feature, viz., that the entire figure, however elaborate, is given to the gilt upon the glass by the mere action of the roller, and the very material which determines and lays this figure serves also as the backing which protects the gilt beneath it from being washed or worn away. This process is applicable to a great variety of purposes, and involves but a very small expense compared with any other way known to me of producing similar or kindred ornamentation on glass, and may be practiced successfully by unskilled persons or children having no experience in drawing, painting, or designing.

What I claim, and desire to secure by Letters Patent, is—

The process of embellishing upon glass plate, substantially as set forth.

ELIAS INGRAHAM.

Witnesses:

JAMES SHEPARD,

N. L. BRIGE.